(12) United States Patent
Chan (10) Patent No.: US 9,323,255 B2
(45) Date of Patent: Apr. 26, 2016

(54) INFORMATION CONTROL SYSTEM

(71) Applicants: Mark Kit Jiun Chan, Hong Kong (CN); Lena Hun Man Chan, Hong Kong (CN); Kit Meng Chan, Hong Kong (CN)

(72) Inventor: Mark Kit Jiun Chan, Hong Kong (CN)

( * ) Notice: Subject to any disclaimer, the term of this patent is extended or adjusted under 35 U.S.C. 154(b) by 190 days.

(21) Appl. No.: 13/896,600

(22) Filed: May 17, 2013

(65) Prior Publication Data

US 2015/0323943 A1 Nov. 12, 2015

Related U.S. Application Data (60) Provisional application No. 61/648,115, filed on May 17, 2012.

(51) Int. Cl.
| | |
|---|---|
| *G05D 23/00* | (2006.01) |
| *G05D 23/19* | (2006.01) |
| *G06Q 10/00* | (2012.01) |

(52) U.S. Cl.
CPC ............ *G05D 23/1951* (2013.01); *G06Q 10/00* (2013.01)

(58) Field of Classification Search
None
See application file for complete search history.

(56) References Cited

U.S. PATENT DOCUMENTS

| | | | |
|---|---|---|---|
| 5,395,042 A | 3/1995 | Riley et al. | |
| 5,915,473 A | 6/1999 | Ganesh et al. | |
| 7,216,016 B2 | 5/2007 | Van Ostrand et al. | |
| 8,086,352 B1 | 12/2011 | Elliott | |
| 2002/0052719 A1* | 5/2002 | Alexander | H04L 41/22 702/188 |
| 2008/0114500 A1 | 5/2008 | Hull et al. | |
| 2009/0164118 A1 | 6/2009 | Breen | |
| 2010/0127919 A1 | 5/2010 | Curran et al. | |
| 2010/0243231 A1* | 9/2010 | Rosen | G05D 23/1919 165/237 |
| 2011/0046792 A1* | 2/2011 | Imes | F24F 11/006 700/278 |
| 2011/0202185 A1 | 8/2011 | Imes et al. | |
| 2011/0231020 A1 | 9/2011 | Ramachandran et al. | |
| 2011/0290893 A1* | 12/2011 | Steinberg | F24F 11/0034 236/49.3 |
| 2012/0031984 A1* | 2/2012 | Feldmeier | F24F 11/001 236/49.3 |
| 2012/0085831 A1* | 4/2012 | Kopp | F24F 11/0009 236/46 A |
| 2013/0073094 A1* | 3/2013 | Knapton | F24F 11/0034 700/278 |
| 2013/0085614 A1* | 4/2013 | Wenzel | F24F 11/006 700/277 |

(Continued)

FOREIGN PATENT DOCUMENTS

| | | |
|---|---|---|
| JP | 2006-284477 A | 10/2006 |
| WO | WO 2014/051635 A1 | 4/2014 |

OTHER PUBLICATIONS

PCT/CN2013/075845 International Search Report, mailed Sep. 26, 2013.

(Continued)

*Primary Examiner* — Kenny Lin (57) ABSTRACT

A system and method is used to characterize a user with properties, such as location in relation to established geofences, speed of traverse, projected traveling time required for a particular distance, etc. Those properties contribute to yielding a quantitative result in the calculated lead time period prior to the user arriving at a monitored space, including but not limited to a rented room in a hotel, and a house. The method uses the user's arrival time to estimate the setback temperature, which is the indoor temperature of a monitored space maintained during unattended time periods. The method also uses the user's arrival time to estimate the heated water volume to be provided, as well as, to house watch other property management interests.

23 Claims, 8 Drawing Sheets

(56) References Cited

U.S. PATENT DOCUMENTS

| | | | |
|---|---|---|---|
| 2013/0085616 A1* | 4/2013 | Wenzel | G05F 1/66 700/278 |
| 2013/0166073 A1* | 6/2013 | Pine | F24F 11/0034 700/276 |
| 2015/0185721 A1 | 7/2015 | Deilmann et al. | |

OTHER PUBLICATIONS

GB 1419520, Report, dated Jan. 23, 2015.
EP 13 79 0120 Supplementary European Search Report dated Dec. 17, 2015.

* cited by examiner

INFORMATION CONTROL SYSTEM

CROSS-REFERENCE TO RELATED APPLICATIONS

The present application claims the priority benefit of U.S. Provisional Patent Application No. 61/648,115, filed 17 May, 2012, under title Information Control System. The disclosure of this nonprovisional application is hereby incorporated herein by reference.

BACKGROUND OF THE INVENTION

1. Field of the Invention

The present invention relates to a user location tracking system ("tracking system") and methods to locate user carried mobile devices, such as those used in digital cellular systems, personal communications systems ("PCS"), enhanced specialized mobile radios ("ESMRs"), radio frequency ("RF") based tracking systems (Bluetooth, WiFi), and other wireless communications systems. More particularly, but not exclusively, the present disclosure relates to methods that employ the location of the individually tracked user to determine the time at which the user arrives ("arrival time") at a monitored space, including the corresponding rented room at a hotel ("rented room"), the total number of tracked users at a hotel for control of the rented room related conditions.

2. Background

A residing guest ("user") at a hotel contributes to energy consumption in the use of a rented room through two primary utility sources: Heating, Ventilating and Air-Conditioning system ("HVAC") and heated water. In conventional HVAC systems, the temperature within a rented room is raised or lowered at multiple operating levels. The indoor temperature is typically maintained at three different levels. The setpoint level is often selected by the user when the rented room is attended. The comfort level is maintained at a few degrees from the setpoint temperature for energy conservation when the rented room is unoccupied while allowing speedy resume to the setpoint level. The free level is used for maximal energy conservation of an unrented room.

Common problem of the comfort level often being the setback temperature either too far away from the setpoint temperature to provide satisfactory comfort when someone returns to the unoccupied monitored space, or too close to the setpoint temperature to achieve adequate energy savings. Indoor temperature at comfort level requires a drive time to be resumed to setpoint temperature; the corresponding estimated minimal required drive time is therefore overly inaccurate. The "Short Cycling" phenomenon may result from insufficient operating times, leading to overshooting the user's setpoint temperature and unbounded up/down temperature cycles within a given time period. The result is unavoidable damage to the HVAC system and shortening of the general operative life span.

In addition to indoor temperature setpoint control, heated water at setpoint temperature must also be readily supplied to the rented rooms. Water heaters fall into one of two categories: 1. tankless type water heaters, and 2. storage tank type water heaters. The hotel usually keeps a track record for heated water consumption regardless of the type of water heater used. Consumption of heated water greatly varies within different times of the day and during different seasons of the year notwithstanding, the volume is also dependent on the number of tracked users being onsite. Should the heated water supply be planned on basis of the projected number of tracked users being at the hotel during the day, the volume of heated water allocated on the per user basis can be maintained at an interrelated level.

In addition, the information related to each projected user's arrival time at the monitored space, the occupancy status being attended or unattended by the user, may also be used for provision of house watching services.

DESCRIPTION OF THE INVENTION

The object of the present invention provides a system and methods to project the user's arrival time at an unoccupied monitored space for determination of the setback temperature, the quantity of heated water consumption, scheduling of service provisions. The operative modes of devices related to the monitored space are changed in accordance with detected or expected presence of intended users.

In various aspects, a system is disclosed for locating and recording with respect to time a proximity log related to location of a user carried mobile device encompassing one or more transmitters for wireless communication. In one embodiment, said mobile device is further equipped with location analysis functionality and selectively transmits a message encompassing the proximity log on its location relative to a predetermined geo-fence area. The system includes an application server that receives the message and determines the user's arrival time at the rented room. In furtherance, the application server proceeds with the calculation of the total number of tracked users with respect to time during the day. In a further aspect, the control station sends obtained attributes to the application server, and controls connected attribute station and external devices in accordance with received proximity logs sent from the application server. The control station includes but not limited to a Building Management System, and a gateway with internet and WLAN connectivity.

In one embodiment, the application server estimates the drive time of temperature response in a HVAC controlled room by the following steps: obtaining the indoor temperature at a beginning point, intermediate points and an end point of the prior drive operation; calculating a drive curve using the beginning, intermediate and end temperatures; and using the drive curve to estimate a time at which the desired temperature will be reached. In an alternative embodiment, estimating the drive time may comprise the steps of: obtaining a plurality of indoor temperature data samples over a period of time corresponding to the prior drive operation; calculating a plurality of drive curve sections, each section calculated using a subset of data samples; conjoining all calculated drive curve sections.

In another embodiment, a method for calculating the quantity of heated water consumption during the day. The application server projects the daily peaks of actual water consumption by utilizing the consumption rate versus time on basis of historic operations, composing a curve of the daily consumption rate versus time, and using the projected number of users at the hotel on basis of a plurality of received proximity logs, and therefore the projected arrival times of tracked users, to project the time at which the daily peaks of heated water consumption will be reached.

In a further embodiment of the method, the application server estimates the time duration of each rented room being in an unoccupied status and composes a schedule of housekeeping service in priority. The dynamic information is stored in a server connected memory means. In yet a further embodiment of a method for determining and setting the operative modes of selected devices related with the rented room, on the basis of the concurrent user location and in accordance with preset operating parameters or user authorization.

BRIEF DESCRIPTION OF THE DRAWINGS

The drawings constitute to embodiments of the present invention and serve to depict the apparatuses infrastructure and operating principles.

DETAILED DESCRIPTION OF THE PREFERRED EMBODIMENTS

The present invention may be better understood with reference to embodiments depicted by supporting drawings, however, it is not intended that the invention be restricted to those depicted embodiments. Those skilled in the art will recognize that variations and modifications can be made without departing from the true scope of the invention as defined by the claims. It is therefore intended to include within the invention all such variations and modifications as fall within the scope of the appended claims and equivalents thereof.

Figure 1:
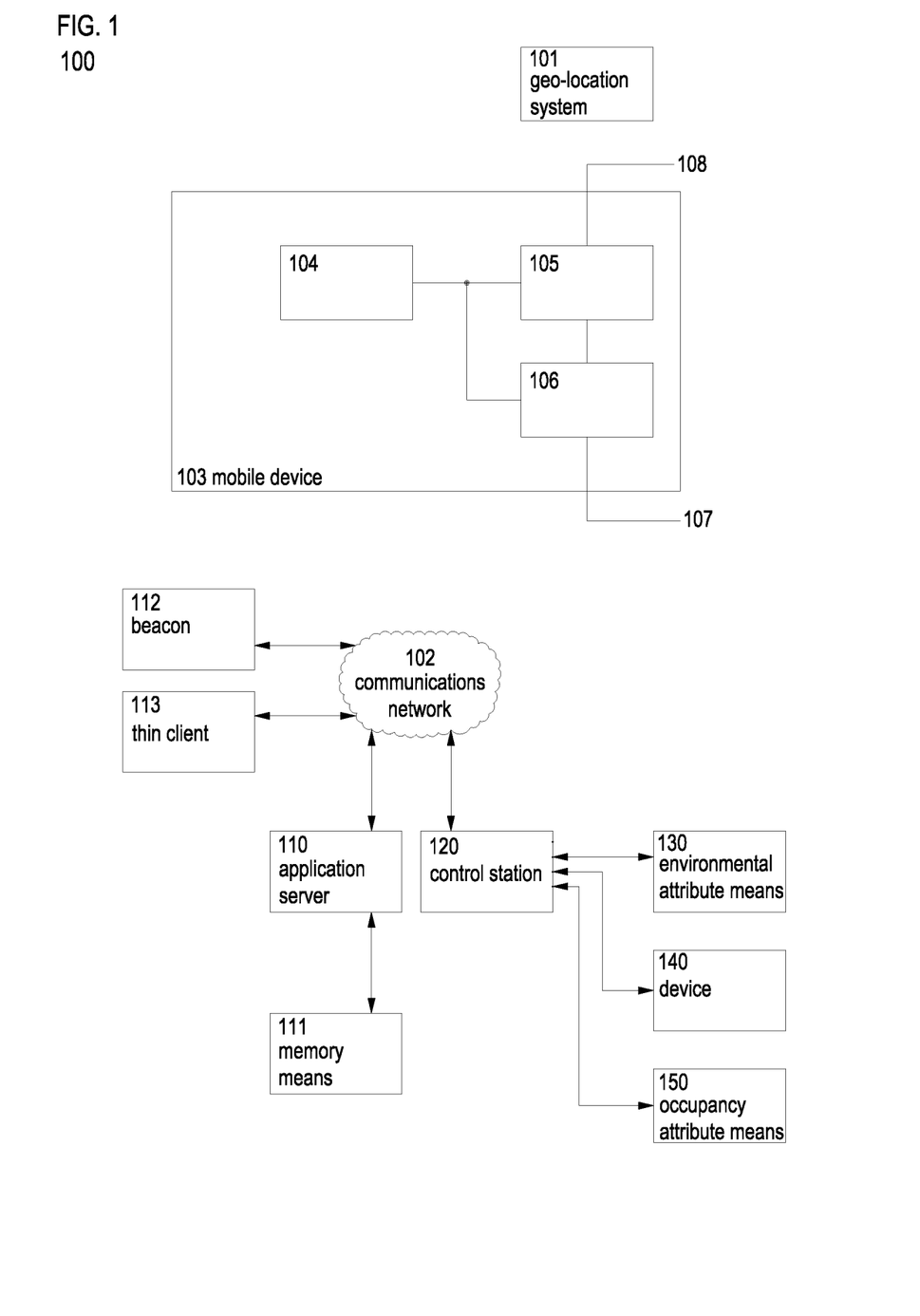
FIG. 1 is a block diagram representation of the present invention of the tracking system.

FIG. 1 illustrates the present invention in environment 100, in which certain preferences in geo-fence details, operating parameters and controls information are selectively sent from application server 110 to mobile device 103. Mobile device 103 is enabled to transmit preferred messages to application server 110 for data logging. Application server 110 performs projection of the arrival time at the rented room of the user carrying mobile device 103. At any time, the user can send a manually entered arrival time through mobile device 103 to application server 110.

Geo-location system 101 is a terrestrial or satellite based positioning system; some of which include but not limited to the Beidou Navigation System, Differential GPS ("DGPS"), Eurofix DGPS, Global Positioning System ("GPS"), pertaining to the Global Navigation Satellite System ("GNSS"). In other types of positioning systems, geo-location system 101 comprising cellular communication towers, or other systems providing reference points, transmit RF signals that are received by mobile device 103.

Mobile device 103 encompasses embedded device 104 (e.g. an onboard computer with memory means (not shown) and limited functionality), geo-receiver 105, telematics device 106 and the corresponding antennae 108, 107. Embedded device 104 is wirelessly loaded with operating parameters, which include but not limited to the geo-fence boundary definitions, the clock time, and the polling interval, etc. Mobile devices 103 include a cellular phone, and a handheld device possessing wireless communication connectivity, such as a tablet computer, and the like.

Typically, geo-receiver 105 processes geo-location system 101 sent signals received by antenna 108, for obtainment of the concurrent location of mobile device 103. In one embodiment, mobile device 103 determines its location by engaging in the trilateration process. Telematics device 106 transmits to application server 110 via antenna 107—at constant or variable specific frequency in time as per the preconfigured polling interval—coded wireless messages comprising the present location and a unique identifier of mobile device 103. In an alternative embodiment, mobile device 103 transmits to application server 110 by telematics device 106 via antenna 107 said coded wireless messages at a defined polling interval in accordance with received application server 110 sent periodic probe requests.

Application server 110 receives information encompassing the mobile device 103 location and unique identifier via network 102. Application server 110 executes a program which calculates the lead time period pertaining to the user's arrival time at the related rented room. Alternatively, application server 110 assigns a predefined lead time period on the basis of the geo-fenced area—related to a geo-fence boundary—in which mobile device 103 is located. The lead time period and the operating parameters of mobile device 103 may be changed in accordance with change in the mobile device 103 located geo-fenced area. Application server 110 may be any equipment capable of facilitating two way communications with telematics device 106 on mobile device 103. In another embodiment, mobile device 103 calculates the lead time period pertaining to the user's arrival time at the related rented room; it sends the most updated proximity log—encompassing at least the calculated lead time period and the unique identifier—to application server 110 in said coded wireless messages.

A library of predefined geo-fence boundaries, the polling interval at constant or variable frequency directing data logging between application server 110 and mobile device 103, quantitative calculations performed by application server 110, and other information such as personal data of the user, is stored in memory means 111 and retrieved by application server 110 via a wired or wireless communicative network. Memory means 111, working with or within application server 110, can be any device, including magnetic, optical or solid-state memory; where stored information can be changed via a communicatively connected thin client 113.

In an outdoor environment for use with geo-location system 101, network 102 uses a combination of wireless and landline communication infrastructure such as a cellular telecommunication system and the internet, provides two-way data logging between telematics device 106 and application server 110.

On the other hand, the wireless and landline communication infrastructure of network 102 pertinent to an indoor tracking system, as depicted in FIG. 1, typically encompasses a combination of WLAN/Ethernet. Wherein, user carried mobile device 103 possessing Bluetooth communicative components and functionality is continually tracked through a node based mesh network (not shown) constructed on basis of a plurality of Bluetooth beacons 112. Bluetooth beacon 112 transmits a signal to mobile device 103 in the indoor environment, and transports the returning signal to the communicatively connected application server 110. Operatively similar to said outdoor tracking system, the proximity log encompassing the lead time period pertaining to the user's arrival time at the related rented room is obtained by application server 110 on basis of the position of mobile device 103.

Figure 2A:
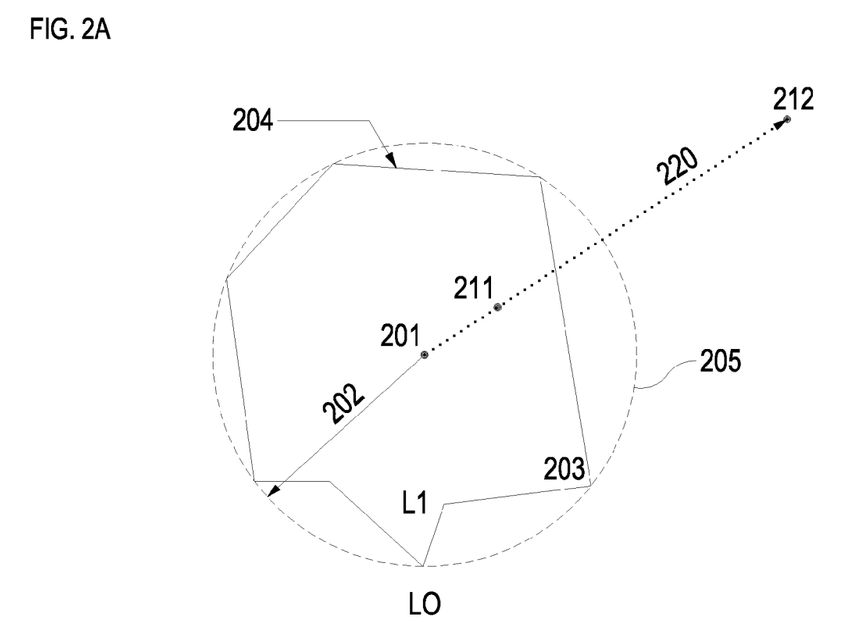
FIG. 2A depicts a traveling trace of user carried mobile device with respect to a polygonal geo-fenced area.

Referring to FIG. 2A, geo-fenced area 203 is the area within a polygonal geo-fence boundary 204. The geo-fenced area 203 has a center-of-mass 201, and a computed circular approximation 205 with radius 202, corresponding to the maximum offset between the computed center-of-mass 201 and the furthest edge of geo-fence boundary 204. The dotted trace 220 depicts an exemplary path of mobile device 103 crossing geo-fence boundary 204 and traveling away from center-of-mass 201, being the related rented room at a hotel, as in one embodiment.

In FIG. 2A, a zone of Level 0 is defined as an area beyond circular approximation 205: a zone of Level 1 may be defined as the area within circular approximation 205. Application server 110 can alter the shape of geo-fence boundary 204 within zone Level 1, in accordance with preconditioning factors pertinent to traffic conditions, time of the day, the unique identifier of mobile device 103 and characteristics of the user or the related rented room, etc.

In one embodiment, application server 110 correlates the data pertinent to the real-time location of the user carrying mobile device 103 to a preconfigured lead time period $\Delta t_a$, which is the time period between the concurrent time and the projected user's arrival time at center-of-mass 201. For instance, a preconfigured value is assigned for lead time period $\Delta t_{a1}$ when mobile device 103 is at position 211, and within the geo-fenced area 203; another preconfigured value is assigned for lead time period $\Delta t_{a2}$ when mobile device 103 is at position 212, which is outside geo-fence boundary 204.

Figure 2B:
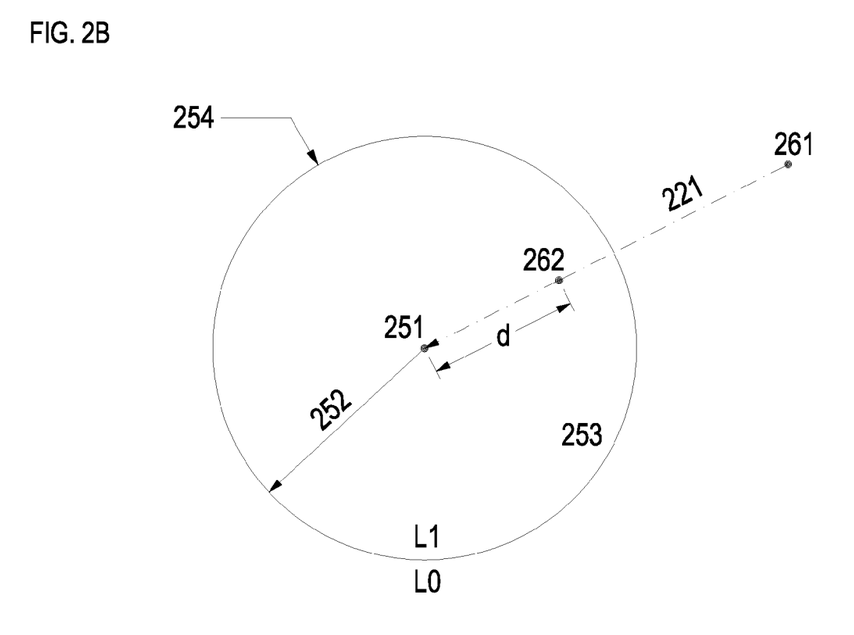
FIG. 2B depicts the locations of user carried mobile device at different instantaneous times with respect to a circular geo-fenced area.

Referring now to FIG. 2B, illustrated is geo-fenced area 253 pertaining to circular geo-fence boundary 254. Geo-fence boundary 254 having radius 252 has been defined around central point 251, being the rented room at the hotel, as in one embodiment. The dotted trace 221 depicts an exemplary path of mobile device 103 crossing geo-fence boundary 254 and traveling toward central point 251. A zone of Level 0 is defined as an area outside geo-fence boundary 254: a zone of Level 1 is the area within geo-fence boundary 254. Application server 110 can alter the coverage of zone Level 1 within geo-fence boundary 254, in accordance with preconditioning factors pertinent to traffic conditions, time of the day, the unique identifier of mobile device 103 and characteristics of the user or the related rented room, etc.

In an alternative embodiment, application server 110 correlates the data pertinent to the real-time location of mobile device 103 to a mathematical calculation of lead time period $\Delta t_a$, as follows:

$$\Delta t_a = \gamma \cdot \frac{d}{v} \quad [1]$$

where $\Delta t_a$ is the lead time period between the concurrent time and the projected user's arrival time at the rented room of central point 251; γ represents a preconfigured factor pertinent to the uncertain preconditions affecting lead time period $\Delta t_a$, such as time of the day, the unique identifier of mobile device 103 and characteristics of the user or the related rented room, etc.; d is the distance between the concurrent location of the monitored mobile device 103 and central point 251; v is the user's velocity of travel, which may be calculated, using:

$$v = \frac{(d_2 - d_1)}{(t_2 - t_1)} \quad [2]$$

where v, is periodically calculated on basis of the time difference to travel from one location to another. For instance, v is indicated by the difference between $d_1$ (traversal distance between first position 261 and central point 251), and $d_2$ (traversal distance between second position 262 and central point 251), divided by the difference of $t_1$ (instantaneous time recorded at first position 261), and $t_2$ (instantaneous time recorded at second position 262). Other formulae and methods may seem fit in different situations where appropriate and therefore can also be applied for calculation of lead time period $\Delta t_a$. Application server 110 performs the calculations and sends the calculated values of lead time period $\Delta t_a$ to control station 120 and other systems.

Those skilled in the art will appreciate that the exemplary methods disclosed herein may be applied to any geo-fenced area represented by any number of shapes and sizes. A geo-fence around a center of mass may range in complexity from a line to a highly irregular shape which more accurately follows the landscape of the hotel premises and neighborhood. There are a number of methods for constructing these geo-fences which will be apparent to one skilled in the art.

Thermal Drift & Drive Relationships

Figure 3:
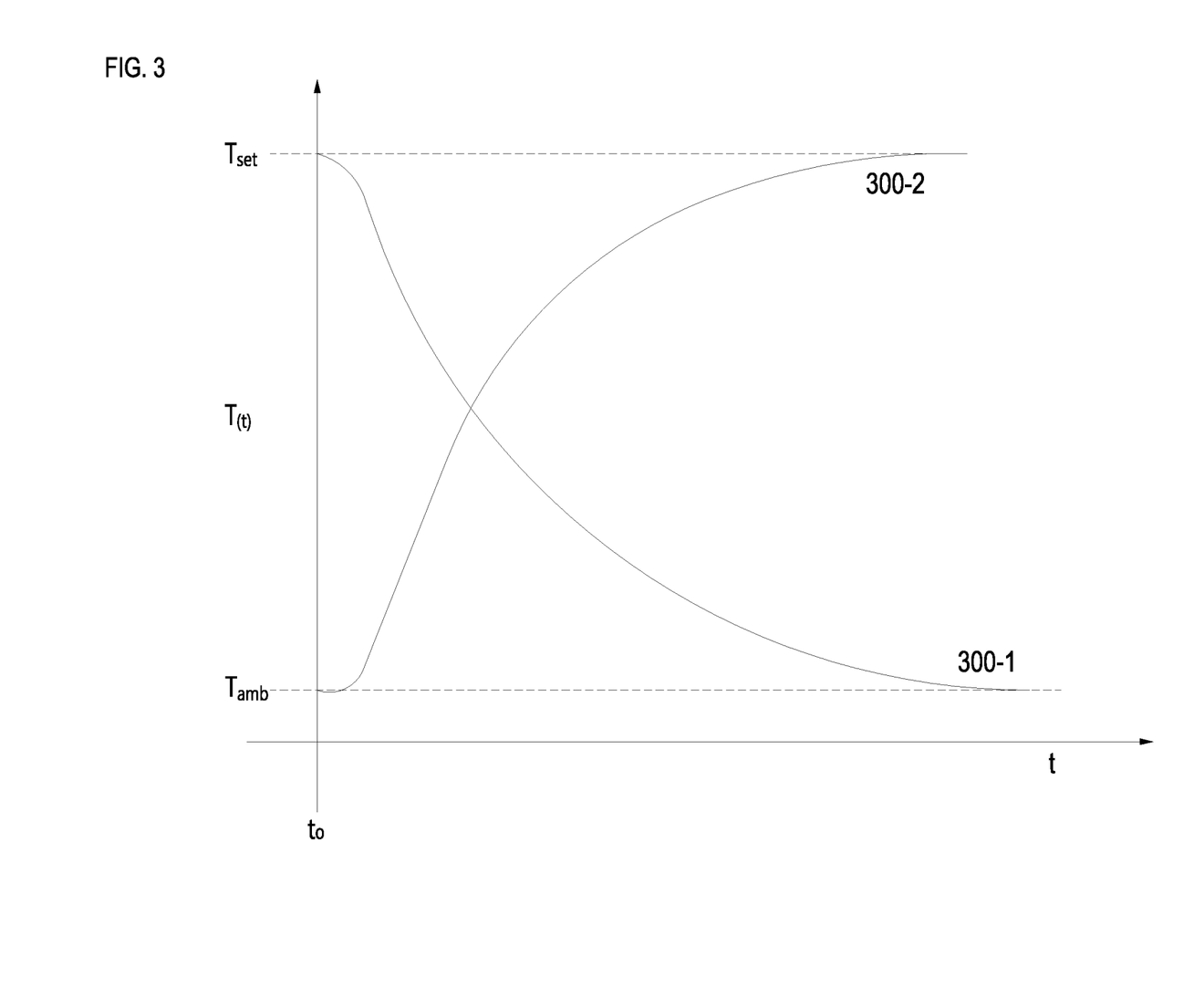
FIG. 3 is a graph depicting the calculated thermal drift & drive relationships within a monitored space, using a non-linear equation.

FIG. 3 illustrates an exemplary temperature change in an indoor space, wherein the outdoor temperature is lower than indoor setpoint temperature $T_{set}$ of the space. Ambient temperature $T_{amb}$ is the temperature at which indoor temperature T(t) will theoretically reach in accordance with indefinite increase in time t, when the HVAC heating operation is off; it is at a constant level in this case for demonstration purposes.

Drift curve 300-1 represents the "drift process" of indoor temperature T(t) with respect to time, beginning at a rapid rate decreasing from setpoint temperature $T_{set}$ as indoor temperature T(t) approaches the steady-state temperature, which is substantially the same as ambient temperature $T_{amb}$. Drive curve 300-2 represents the "drive process" of indoor temperature T(t) of the space being driven from ambient temperature $T_{amb}$ up to setpoint temperature $T_{set}$ in relation to time during a HVAC heating operation. The drive rate is decreasing as indoor temperature T(t) approaches setpoint temperature $T_{set}$. The required time period to drift indoor temperature T(t) from one level to another varies in accordance with time and season, as well as other factors such as the weather and energy sinks within the space. In contrast, drive curve 300-2 is dependent on the unique space environment, and HVAC system performance. The data pertaining to the relationships between temperature responses to HVAC operation must be obtained to project the time period for indoor temperature T(t) to drift from one point to another, as well as the time to drive indoor temperature T(t) from one point to another. For a cooled room on a warm day, the principles are the same, yet the directions of increasing temperature on the y-axis would be inverted.

In one embodiment, mathematical functions may be used to describe the temperature responses through drift curve 300-1 and drive curve 300-2. In an exemplary use case, Newton's Law of Cooling is used for calculation of the drift and drive performances. The rate of change of indoor temperature T(t) over time dT/dt, is proportional to the difference between indoor temperature T(t) and ambient temperature $T_{amb}$. A differential equation is used in a mathematical form, as follows:

$$\int \frac{dT}{(T - T_{amb})} = k \int dt \quad [3]$$

where indoor temperature T(t) corresponds to a drift process from setpoint temperature $T_{set}$ to ambient temperature $T_{amb}$. Solving the differential equation, we yield an equation having indoor temperature T(t) as a function of time:

$$T(t) = T_{amb} + (T_{set} - T_{amb})e^{-kt} \quad [4]$$

where k is a constant dependent on the surrounding environment within the space. Having measured indoor temperature T(t) at any time t, and knowing ambient temperature $T_{amb}$, the value of k can be easily sorted.

In an alternative embodiment, application server 110 obtains ambient temperature $T_{amb}$, indoor temperature T(t) pertaining to the drift and drive data from environmental attribute means 130, records, and stores the data in memory means 111. In yet another embodiment, application server 110 receives a data feed from control station 120, or other external sources, comprising drift and drive data of indoor temperature T(t), and ambient temperature $T_{amb}$. Calculations, data recording and external information source pertaining to obtainment of drift data, drive data and ambient temperature $T_{amb}$, can be continually processed, stored in memory means 111, and used for studying indoor temperature T(t) responses versus time t during a HVAC cooling or heating operation in a space.

Figure 4:
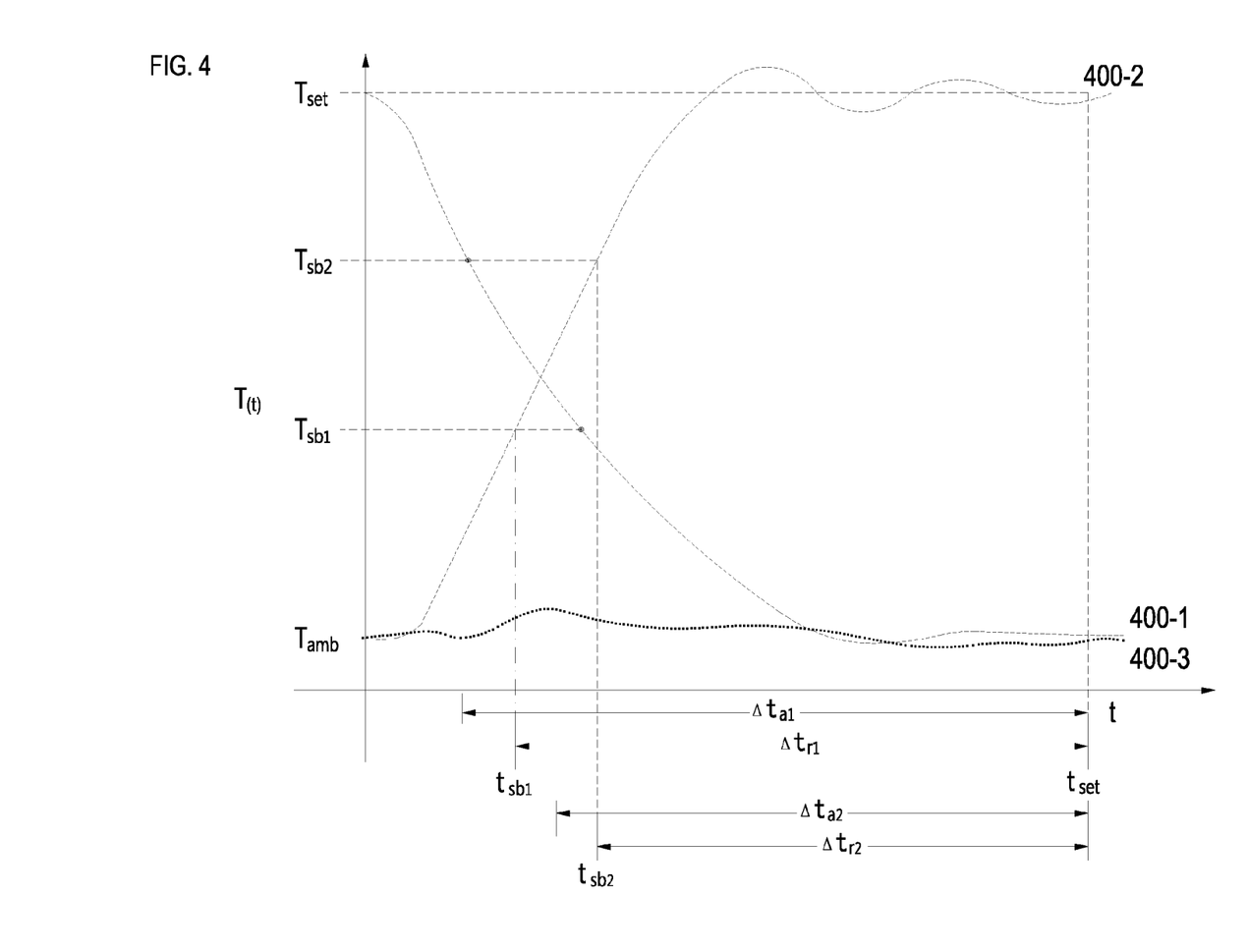
FIG. 4 is a graph depicting the thermal drift & drive relationships within a monitored space, identifying recorded data samples over a period of time.

FIG. 4 illustrates an exemplary indoor temperature T(t) response in accordance with drift curve 400-1 and drive curve 400-2. Dotted curve 400-3 of the fluctuating ambient temperature $T_{amb}$ varies in compliance with outdoor temperature changes during the day.

Setback temperature $T_{sb}$ is a temperature level of an unoccupied rented room maintained by a HVAC system, which is intended to resume to setpoint temperature $T_{set}$ within a short time after user entry. The required time to drive setback temperature $T_{sb}$ to setpoint temperature $T_{set}$ is recovery time period $\Delta t_r$—which is dependent on the HVAC system capacity. It is better expressed as:

$$\Delta t_r = t_{set} - t_{sb} \quad [5]$$

where $t_{set}$ is the time at which indoor temperature T(t) is driven toward setpoint temperature $T_{set}$; $t_{sb}$ is the starting time of the drive process, at which indoor temperature T(t) equals to setback temperature $T_{sb}$.

In one embodiment, application server 110 calculates recovery time period $\Delta t_r$ on the basis of the obtained user's arrival lead time period $\Delta t_a$, then extrapolates the corresponding indoor setback temperature $T_{sb}$, based on the relationships between the temperature responses and time in a drift process and a drive process. Attention is drawn with care to make sure that recovery time period $\Delta t_r$ should be within lead time period $\Delta t_a$ to complete drive of setback temperature $T_{sb}$ to setpoint temperature $T_{set}$:

$$\Delta t_r \leq \Delta t_a$$

Or, $$\Delta t_r = \alpha \cdot \Delta t_a \quad [6]$$

where α represents a preconfigured factor mathematically describing the uncertainty affecting lead time period $\Delta t_a$. In another embodiment, recovery time period $\Delta t_r$ is also expressed as:

$$\Delta t_r = r \cdot |T_{set} - T_{sb}| \quad [7]$$

where recovery rate r (expressed in unit time per unit temperature, such as seconds per ° C.) is the rate for the HVAC system to drive indoor temperature toward setpoint temperature $T_{set}$. Recovery rate r is calculated as follows:

$$r = \frac{(t_{set} - t)}{|T_{set} - T(t)|} \quad [8]$$

where T(t) is the indoor temperature of the space during any time t.

Data encompassing recovery rate r in relation with ambient temperature $T_{amb}$ can be stored in memory means 111. Any technique of calculating and combining the most recently calculated recovery rate r and an archived recovery rate r can also be utilized.

Other than recovery rate r yielded by equation [8] or others, the manufacturer of the HVAC system also provides the recommended recover rate $r_m$ under different ambient conditions for assurance of optimal operative efficacies and equipment life span. Therefore, recovery rate r should be maintained at a rate not exceeding the recommended recover rate $r_m$:

$$r \leq r_m$$

Or, $$r = \beta \cdot r_m \quad [9]$$

where β represents a preconfigured factor mathematically describing variables affecting recovery rate r in a temperature drive operation. Substituting equations [6] and [9] into equation [7]:

$$T_{sb} = T_{set} - \frac{(\alpha \cdot \Delta t_a)}{(\beta \cdot r_m)} \quad [10]$$

setback indoor temperature $T_{sb}$ of a space using lead time period $\Delta t_a$, is yielded.

Figure 5:
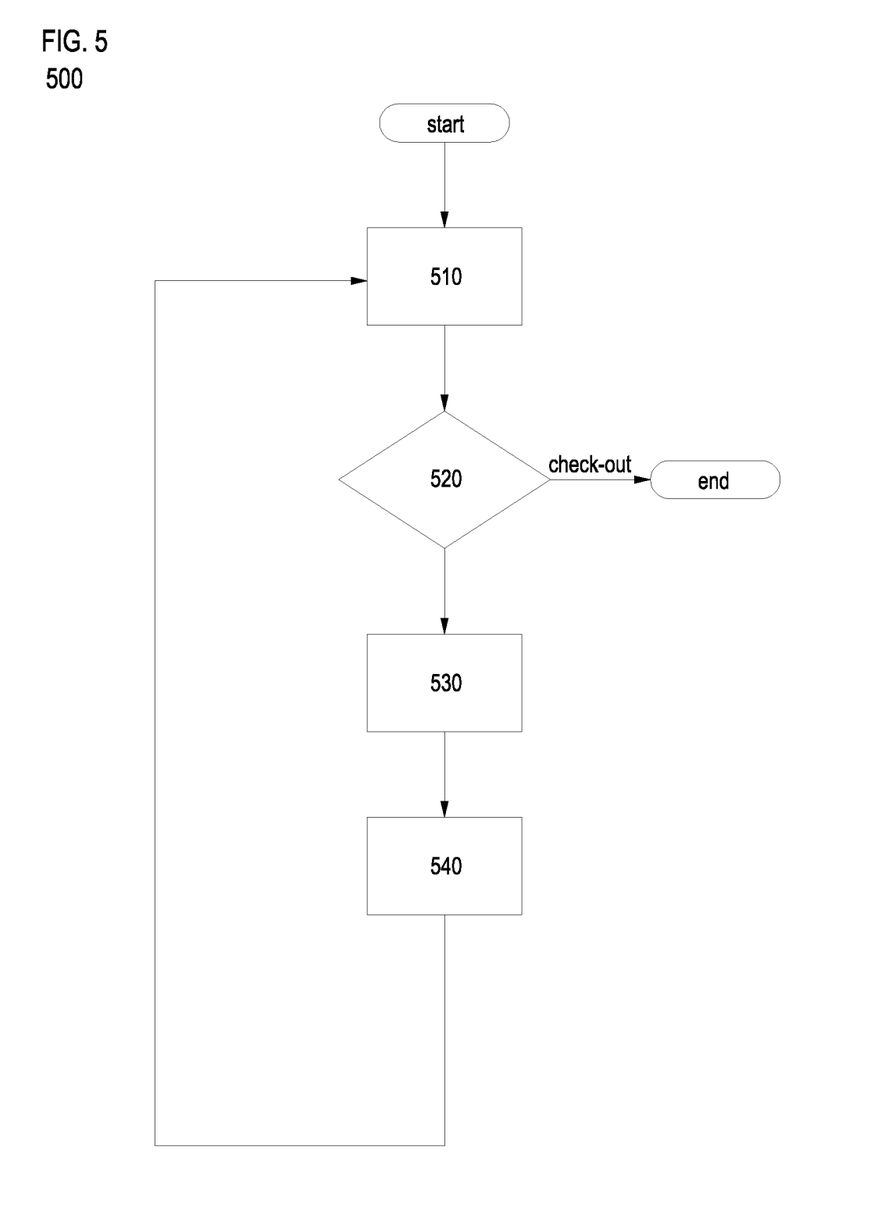
FIG. 5 is a flow chart depicting a method to calculate setback room temperature settings, and the projected heated water consumption quantity, using the user location and projected user's arrival time at a hotel.

These drift and drive parameters are used in the methods of the invention for determining the corresponding setback temperature $T_{sb}$, as shown in flow chart 500 of FIG. 5. Typically, application server 110 determines the values of setback temperature $T_{sb}$ in the unoccupied rented room, while receiving different location related information pertaining to mobile device 103. It is realized that application server 110 receives information encompassing whether the rented room status is unoccupied, from a separate system.

At step 510, application server 110 periodically receives data pertaining to the rented room from control station 120, including setpoint temperature $T_{set}$, indoor temperature T(t) and ambient temperature $T_{amb}$, and stores the data in memory means 111 for mathematical establishment of thermal drift & drive relationships as illustrated in an exemplary graphical form in FIG. 4. It is worthwhile to point out that the objective conditions—such as ambient temperature $T_{amb}$—are continuously changing; said thermal drift & drive relationships are on a continually updated mathematical platform that affects the calculated results.

In one embodiment, a user carrying mobile device 103 departs from the rented room. At step 520, application server 110 receives the proximity log from mobile device 103 carried by the user of the rented room—said information including but not limited to indicating the operative environment for tracking mobile device 103 being outdoor or indoor based. At the same time, application server 110 determines if the rented room is unoccupied on basis of information received from at least one other communicatively connected system. Application server 110 analyzes the proximity log and ends the process if the rented room status is identified as "checked-out". Conversely, application server 110 projects the time at which the user will return to the rented room and determines a corresponding setback indoor temperature $T_{sb}$, on basis of archived numerical thermal drift and drive data. The process proceeds to step 530.

Referring to FIG. 2B, application server 110 receives the proximity log from mobile device 103 corresponding to the first position 261 recorded at the first instantaneous time $t_1$, and determines the value of $d_1$ (traversal distance between first position 261 and central point 251). At step 530, application server 110—in one embodiment—uses a preconfigured value of lead time period $\Delta t_{a1}$ on basis of position 261 being outside geo-fenced area 253, and calculates the corresponding recovery time period $\Delta t_m$, using equation [6]. Application server 110 extrapolates the corresponding setback indoor temperature $T_{sb1}$, based on the temperature responses in a drift process and drive process of the rented room as shown in FIG. 4. Alternatively, application server 110 calculates setback temperature $T_{sb1}$ by using equation [10]. At step 540, application server 110 sends data pertaining to setback temperature $T_{sb1}$ to control station 120, for controlling HVAC system of environmental attribute means 130 in maintaining temperature of the rented room at a less energy demanding setback temperature $T_{sb1}$. The process returns to step 510.

In a further embodiment, application server 110 receives the proximity log from mobile device 103 corresponding to the second position 262 recorded at the second instantaneous time $t_2$, and determines the value of $d_2$ (traversal distance between second position 262 and central point 251). At step 530, application server 110 calculates the user's velocity of travel v, using equation [2]:

$$v = \frac{(d_2 - d_1)}{(t_2 - t_1)} \quad [2]$$

substituting velocity v into equation [1] to yield lead time period $\Delta t_{a2}$, application server 110 calculates the corresponding recovery time period $\Delta t_{r2}$, using equation [6].

Application server 110 extrapolates the corresponding setback indoor temperature $T_{sb2}$, based on the temperature responses in a drift process and drive process of the rented room as shown in FIG. 4. Alternatively, application server 110 calculates setback temperature $T_{sb2}$ by using equation [10]. At step 540, application server 110 sends data pertaining to setback temperature $T_{sb2}$ to control station 120. Control station 120 initiates HVAC system of environmental attribute means 130 for adjusting indoor temperature $T(t)$ from setback temperature $T_{sb1}$ to setback temperature $T_{Sb2}$. Setback temperature $T_{Sb2}$ will be driven to setpoint temperature $T_{set}$ within recovery time period $\Delta t_{r2}$.

Provision of Heated Water and Services

In another aspect of the invention, the tracking system is applied to projection of the total number of tracked users at the hotel with respect to time. Having obtained each tracked user's time of departing, and time of arriving at the hotel in accordance with the user's proximity log, yields the estimated number of total users at the hotel during any time of the day. In furtherance, the settings of the temperature and the reserve volume in the hotel water heater system of environmental attribute means 130 can be projected.

Figure 6A:
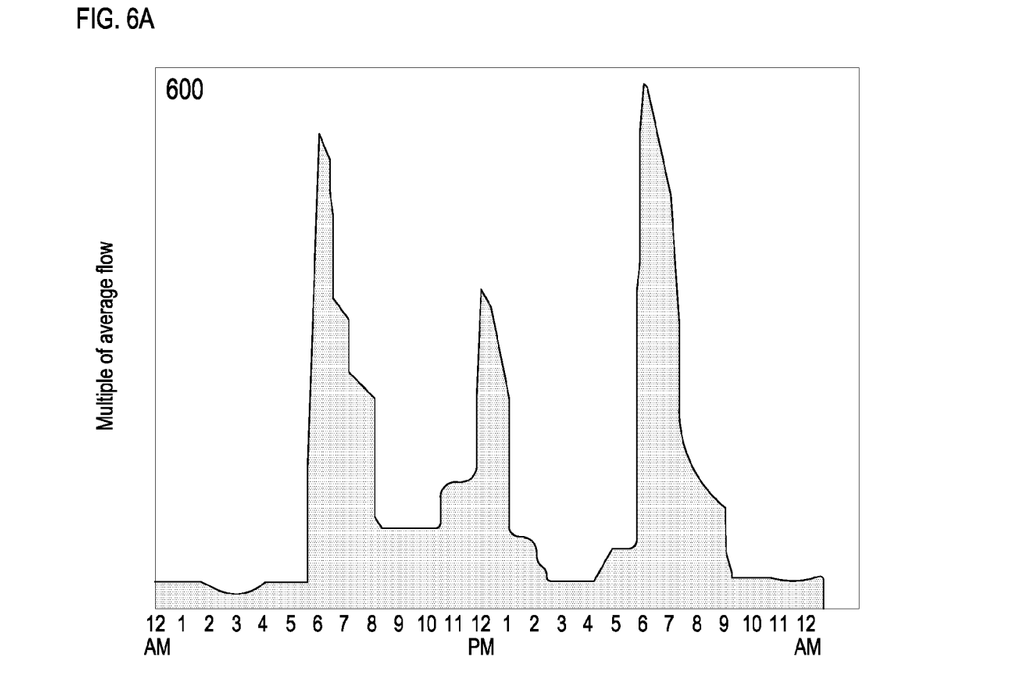
FIG. 6A is a graph depicting the historic heated water consumption rate on an average day at a hotel.

The hotel's daily heated water consumption pattern is a function of the number of users and time, whereas, controls in heated water supply apply to the water flow, as well as, the heat flow. FIG. 6A illustrates the heated water consumption rate on a typical day at a hotel having an occupancy rate of 70% in an exemplary profile 600: recorded peaks exist between 6 p.m.-7 a.m. (90%-100% users on-site), 12 p.m.-1 p.m. (30%-45% users on-site), and 7 p.m.-8 p.m. (60-80% users on-site).

Figure 6B:
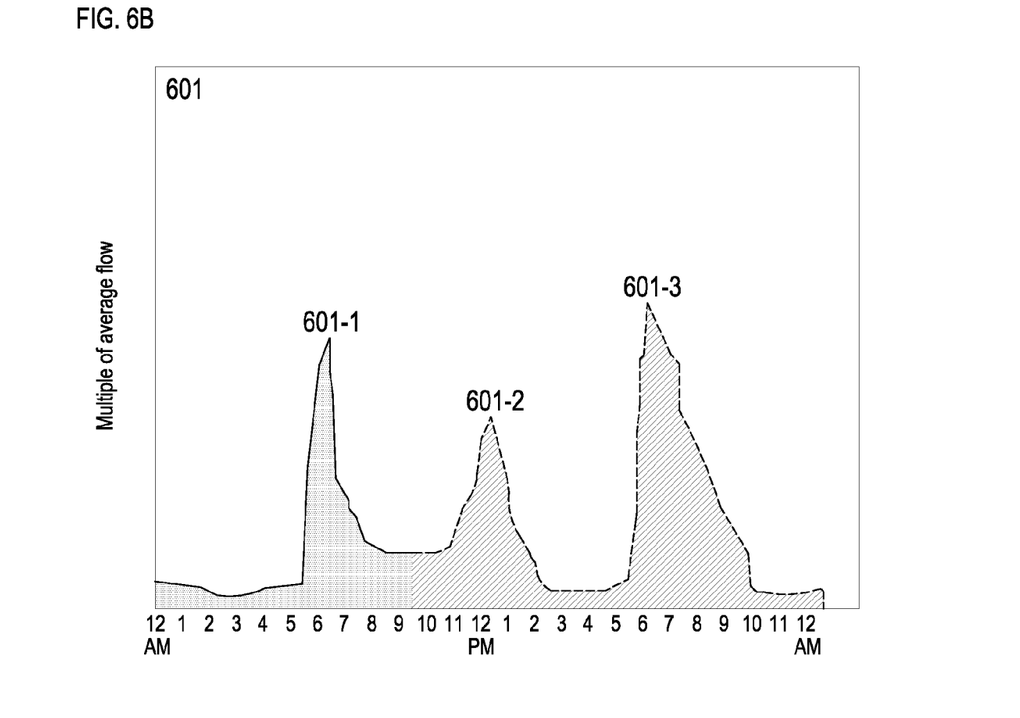
FIG. 6B is a graph depicting the recorded heated water consumption rate, and projected heated water consumption rate based on a plurality of projected users' arrival times at a hotel.

An exemplary profile 601 in FIG. 6B depicts the heated water consumption rate on an average day at a hotel with a 90% occupancy rate; wherein recorded data is available up to the concurrent time at 9:30 a.m. The typical historic records stored in memory means 111 (FIG. 1) including but not limited to the archived profile 600, and the projected number of users at the hotel, are attributes to establishing profile 601. The first recorded peak 601-1 exists between 6 a.m. —7 a.m. (90% —100% users on-site).

In one embodiment, application server 110 projects the total number of users at the hotel at any time, by subtracting each departed tracked user with respect to the recorded departure time, and adding an arriving tracked user with respect to the projected arrival time at the hotel, in addition to an estimated number of residing untracked users. The typical per user consumption rate of heated water at peak demand is 45 liter/hour, whereas a typical daily per user consumption of heated water at 60-160 liters. The projection on heated water consumption rate may be segregated into 9:30 a.m. to 1:30 p.m. with a prime accuracy within 4 hours from concurrent time, and at a secondary accuracy from 1:30 p.m. to 12 a.m. The projected peak 601-2 at 12 p.m-1 p.m. and projected peak 601-3 at 7 p.m.-9 p.m. are shown in profile 601, which is continually amended with most recently recorded and calculated lead time period $\Delta t_a$ pertinent to each tracked user.

In yet another embodiment, application server 110 calculates the required volume of heated water in a storage tank type water heater at setpoint temperature, typically between 48° C. to 60° C., which is readily for use. Energy conservation may be achieved by consistently maintaining a minimal 30 liter per user of heated water volume, or V, at setpoint temperature. The total required heated water volume in storage at any time, $V_{tot}$, can be found:

$$V_{tot} = n \cdot V \quad [11]$$

where n is total number of users at the hotel.

The heated water consumption $\Delta V$ within a time period $\Delta t$ can be sought, using the following equation:

$$\Delta V = n \cdot Q \cdot \Delta t \quad [12]$$

where Q is the per user flow rate of heated water use.

Application server 110 continually projects the total number of users n, for establishment of a database pertaining to profile 601. At step 540 of FIG. 5, application server 110 transports the related information to one or more separate systems, which includes at least one of control station 120, and water heater system of environmental attribute means 130.

Resource Allocation and Service Provision

Figure 7A:
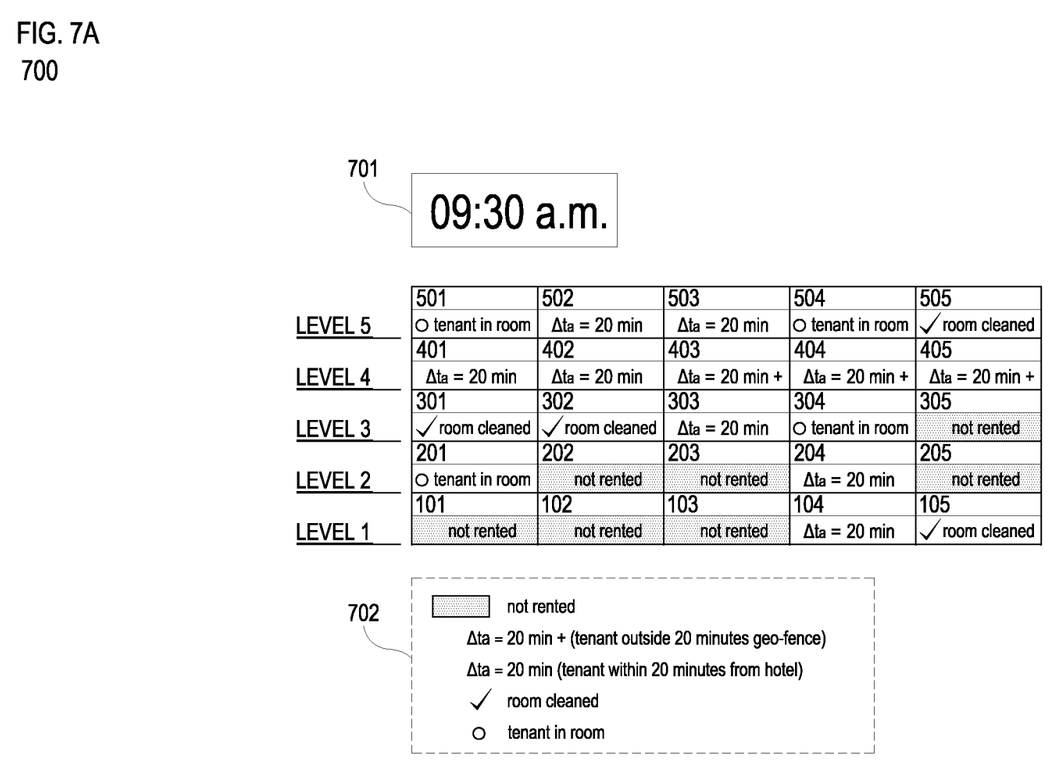
FIG. 7A depicts a schedule for allocating human resources in service provisions with prioritization in accordance with rented room users' arrival times.

The tracking system of the invention also applies to human resources allocation in hotelier operations. Referring to FIG. 7A, table 700 is an exemplary dynamic schedule indicating priority in providing housekeeping services in a five storey hotel. This schedule can be displayed via a communicatively connected device, including but not limited to mobile device 103, and thin client 113 (FIG. 1).

Slot 701 shows the clock time used by the tracking system. Slot 702 indicates different states of a rented room. Application server 110 receives a message from a separate, communicatively connected system indicating the status of each hotel room as "not rented", "unoccupied", etc. Referring to FIG. 2A, the lead time period $\Delta t_a$ of a user pertaining to a rented room at center-of-mass 201 is determined on the basis of a single geo-fence boundary 204 with geo-fenced area 203 pertaining to 20 minute traffic time. The lead time period $\Delta t_a$ relating to the time period before the user returns to center-of-mass 201 is determined at "20 minutes", given the tracked user location is within the geo-fenced area. The lead time period $\Delta t_a$ is suggested at "20 minutes+" otherwise. Application server 110 changes the lead time period $\Delta t_a$ related to each unoccupied rented room in table 700 in accordance with the periodically updated proximity log of the corresponding tracked user. The housekeeping staff can prioritize the unoccupied rented rooms to be serviced; and change the room status through said communicatively connected device as "room cleaned", upon completion of the housekeeping task.

House Watching a Monitored Space

The tracking system of the invention house watches a monitored space in accordance with the continually updated attributes, as well as, proximity logs of one or more mobile devices 103 carried by the related tracked users. In one aspect, the tracking system determines the security status, and the operative modes of a plurality of devices 140 within or related to a monitored house, in accordance with an exemplary method 750 in FIG. 7B.

Figure 7B:
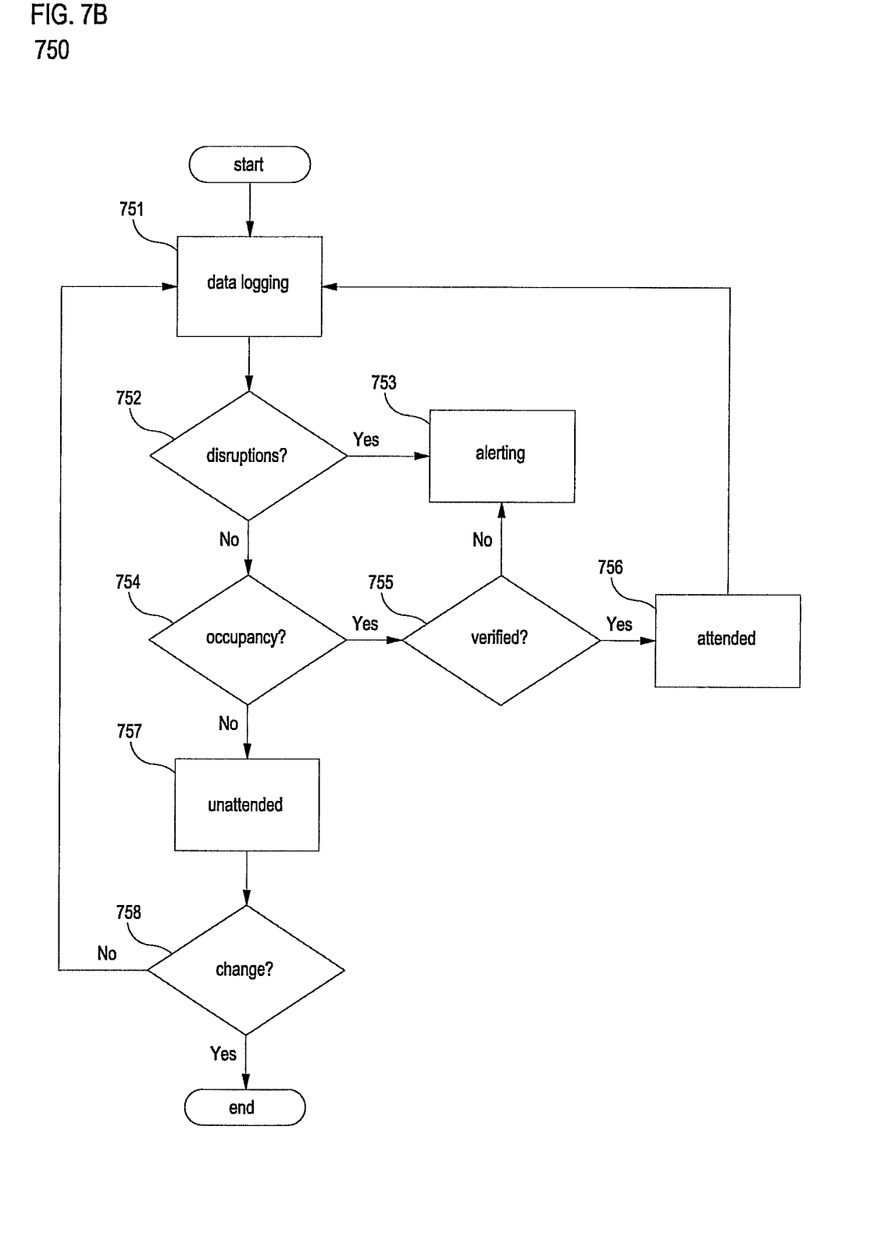
FIG. 7B is a flow chart depicting a method to house watch a monitored space.

Referring to FIG. 1, application server 110 determines whether one or more mobile devices 103 are within or outside the pertinent monitored house, in accordance with the corresponding proximity logs. At step 751 of process 750, application server 110 periodically receives signal transmissions, including but not limited to data comprising the occupancy attribute from occupancy attribute means 150 pertaining to the monitored house, as well as, said one or more mobile devices 103.

At step 752, application server 110 analyzes the signal transmissions. In one embodiment, signal transmissions are disrupted or discontinued—application server 110 sends a probe signal to control station 120 via network 102, and the response is incompliant with preconfigured parameters. At step 753, application server 110 sends an alert to a third party, comprising at least one of the property management, security organization, mobile device 103, and thin client 113. In a contrary embodiment, signal transmissions incompliance between control station 120 and application server 110 are not experienced, process 750 proceeds to step 754. Wherein, application server 110 analyzes said occupancy attribute.

In one embodiment, application server 110 determines that the house is "occupied", or, application server 110 receives a message comprising change in said occupancy of the house; wherein, such change comprises a few aspects. In one exemplary aspect, device 140 comprising a door lock detects a visiting party's attempt to switch the locked state to unlocked state, and sends a corresponding signal to application server 110.

At step 755, application server 110 analyzes the proximity logs of said one or more mobile devices 103. If application server 110 fails to verify the identities of occupants in the occupied house, or, the identity of said visiting party attempting to switch the locked state to the unlocked state of a door lock pertinent to the unoccupied house, an alert is sent to said third party in accordance with step 753. In a different embodiment, the identities of occupants are verified, alternatively, the identity of said visiting party is verified. In a further embodiment, application server 110 determines in accordance with the proximity logs, one or more mobile device 103 are approaching the house within a close proximity threshold. Process 750 proceeds to step 756.

At step 756, application server 110 distinguishes said verified occupants, or verified said visiting party, or verified said approaching one or more mobile device 103, by analyzing the identifiers and the corresponding proximity logs. In accordance with the results of identity distinguishment, application server 110 sends one or more signals for receipt by said plurality of devices 140 to change the operative mode from an "unattended state" to a "user configured state", or, from an "unattended state" to a "management state". In one embodiment, application server 110 receives the audit trail from a door lock pertaining to device 140, records in memory means 111 (FIG. 1) and sends to said third party time-in and time-out of all entries and exits, in accordance with the results of identity verification and distinguishment.

In an alternative embodiment, application server 110 determines that the monitored house is "unoccupied". At step 757, application server 110 sends to control station 120, one or more signals for receipt by a plurality of devices 140, to change the operative mode to an "unattended state". Process 750 proceeds to step 758.

At step 758, application server 110 determines if there is change, including but not limited to the pertinence between said one or more mobile devices 103, and said monitored house. In one embodiment, application server 110 determines no said change—process 750 returns to step 751. In an alternative embodiment, application server 110 determines said change. In one exemplary aspect, the pertinence between said one or more mobile devices 103 and said house—being a lease—is discontinued upon check-out. Process 750 is ended.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

TERMINOLOGY

External Device—communicatively connected to the system, including but not limited to a door lock, a light fixture, a home appliance, a safe, etc.

Thin Client—a network linked electronic device with computing capacity, such as a microcomputer or a handheld personal digital assistant ('PDA'), etc.

Off Mode—power disconnection.

Operative Mode—a device operating at an unspecified level.

Management State—an operative mode of a device operating at configurations imposed by property management, including but not limited to reduced power consumption.

Unattended State—an operative mode of a device operating at different levels, comprising: reduced power consumption, including but not limited to "sleep" mode and "standby" mode; alternatively, a device is configured to set off an alarm if the physical state is changed, including but not limited to "locked" to "unlocked", "closed" to "open"; and, code/PIN entry for attempt of open or use.

User Configured State—an operative mode of a device performing at a user specified level, selected from functions, security level, or power consumption.

What is claimed is:

1. A method for controlling an environmental attribute of a monitored space with an application server having an established drift and drive relationship where drifting the environmental attribute and driving the environmental attribute represent not operating and operating, respectively, an environmental attribute means, including, if the monitored space is unoccupied, a time of arrival of a user of a mobile device at a geographic location in relation to the monitored space, the method comprising:

defining a geo-fence area wherein the monitored space is located;
sending a present geographic location or proximity log of the mobile device to the application server;
projecting the time of arrival of the user at the monitored space on the basis of the present geographic location or proximity log of the mobile device; and
determining a setback recovery time period in accordance with the established drift and drive relationship, wherein the time of arrival at the monitored space of the user of the mobile device corresponds with the setback recovery time period.

2. The method of claim 1, further comprises:
monitoring the level of the environmental attribute of the monitored space;
sending a detected level of the environmental attribute to the application server;
determining a setback attribute, which is to be driven to a setpoint within the setback recovery time period, in accordance with the established drift and drive relationship;
sending the setback attribute to a control unit or environmental attribute means;
allowing the environmental attribute in the monitored space to drift to the setback attribute level when the monitored space is unoccupied; and,
driving the environmental attribute at the setback attribute level so the environmental attribute proceeds toward the setpoint within a time period related to a time of arrival of the user at the monitored space.

3. The method of claim 1 further including determining a setback level of an environmental attribute, or setback attribute,
executing a program having instructions stored in a memory means of the application server communicatively connected to an environmental attribute means;
receiving from the environmental attribute means in accordance with sent operating parameters the environmental attribute pertaining to the monitored space, and further processing data, including a predetermined setpoint, a predetermined maximum range relative to the setpoint, a first drift relationship, and a first drive relationship;
establishing a first drift relationship by drifting with respect to time the attribute from the setpoint, to the maximum range relative to the setpoint; and
drifting with respect to time at least one intermediate attribute between the setpoint, and the maximum range relative to the setpoint, to the maximum range relative to the setpoint;
establishing a first drive relationship by driving with respect to time the attribute from the maximum range relative to the setpoint, to the setpoint; and driving with respect to time the at least one intermediate attribute between the setpoint, and the maximum range relative to the setpoint, to the setpoint;
storing in the memory means at least one drive relationship and at least one drift relationship; and
determining whether the at least one monitored space is occupied.

4. The method of claim 3, wherein:
the monitored space representing an independently located space that includes at least one of independently segregated and monitored minimal space which is selected from a group including a hotel, a house, and a commercial building;
the setpoint is a predetermined level of the environmental attribute;
the maximum range is mathematically determined; or,
the maximum range is empirically determined—the maximum range is obtained when the monitored space is unoccupied, by a sensor that monitors the environmental attribute and provides data to the application server, wherein the environmental attribute in the monitored space is allowed to drift towards an ambient level of said environmental attribute in a region adjacent to the monitored space.

5. The method of claim 3, wherein:
the environmental attribute of the monitored space is indoor temperature; and
the environmental attribute means includes a temperature sensor, and at least one of a heating unit, an air conditioning unit and a ventilating unit.

6. The method of claim 3, wherein:
the environmental attribute of the monitored space is humidity; and
the environmental attribute means includes a humidity sensor, and at least one of a humidifier and a dehumidifier.

7. The method of claim 3, further comprising drifting an environmental attribute, representing reducing the environmental attribute by consumption, driving an environmental attribute representing increasing the environmental attribute, including the additional steps of:
determining the proximity logs pertaining to tracked mobile devices carried by the total number of users, concurrently comprising non-traversing users located in the monitored space pertaining to null proximities, as well as, traversing users projected to arrive in the monitored space in accordance with the corresponding proximity logs;
determining with respect to time the projected number of non-traversing users located in the monitored space, including determining in accordance with the proximity logs the corresponding number of traversing users arriving in the monitored space;
calculating with respect to time the setback attribute by multiplying the projected number of non-traversing users with a predefined unitary attribute quantity;
determining in accordance with at least one established drift relationship, the ratio with respect to time between the drifted attribute and the number of non-traversing users; and
sending the setback attribute with respect to time, and the ratio with respect to time, to a control unit of the environmental attribute means.

8. The method of claim 3, wherein:
the monitored space representing an independently located space encompassing at least one independently segregated and monitored minimal space, which is selected from a group including a hotel, a house, and a commercial building;

the setpoint, representing the predefined unitary attribute quantity multiplied by the total number of users; and the maximum range is empirically determined—the maximum range is measured if the attribute is allowed to drift towards a level, within a given time span, comprising the largest difference with the setpoint.

9. The method of claim 3, wherein:

the environmental attribute of the monitored space is the heated water reserve quantity at a predetermined temperature;

the predefined unitary attribute quantity is the heated water reserve quantity at the predetermined temperature readily supplied for one user of the total number of users; and the environmental attribute means includes at least one of a sensor for measuring the volume of the attribute in a storage tank, and a water heating unit.

10. The method claim 3 wherein the environmental attribute of the monitored space is a temperature of heated water in a water heating unit, and the method includes sensing the temperature of the water in the water heating unit with a temperature sensor.

11. The method of claim 1, further comprising calculating the time of arrival based on a velocity of the mobile device in change of geographic location.

12. The method of claim 1, further comprising altering the geo-fence area in accordance with preconditioning factors pertaining to selected traffic conditions, time, and characteristics of the users and the mobile device.

13. The method of claim 1, further comprising preconfiguring the time of arrival as one preconfigured value when the present geographic location of the mobile device is within the geo-fence area, and as another preconfigured value when the present geographic location of the mobile device is outside of the geo-fence area.

14. The method of claim 1, further comprising using the mobile device to send a manually entered arrival time to the application server.

15. The method of claim 1, in which the monitored space is a guest room in a hotel, a house, or an office unit in a commercial building.

16. The method of claim 1, further comprising recording the time in which the setback attribute is established, geographical location of the user, and estimating a lead time period for the user at the determined geographical location to arrive at the monitored space.

17. The method of claim 1, further comprising detecting the geographical position of the user, estimating a time period required by the user at the determined geographical position to arrive at the monitored space.

18. The method of claim 1 further comprising having the time of arrival correspond with the lapse of the setback recovery time period.

19. A system for controlling an environmental attribute of a monitored space, the system comprising:

an application server having an established drift and drive relationship where drifting the environmental attribute and driving the environmental attribute represent not operating and operating, respectively;

an environmental attribute means in operative communication with the application server, and including an indication of whether the monitored space is unoccupied; and a mobile device in communication with the application server to provide a geographic location in relation to the monitored space and send a present geographic location or proximity log of the mobile device to the application server whereby the application server unit projects the time of arrival of a user at the monitored space on the basis of the present geographic location or proximity log of the mobile device, and further determines a setback recovery time period in accordance with the established drift and drive relationship so that the time of arrival at the monitored space of the user of the mobile device corresponds to the setback recovery time period.

20. The system of claim 19 further comprising a sensor that monitors the environmental attribute and provides data to the application server regarding same.

21. The system of claim 20 wherein the sensor is a temperature sensor to monitor a temperature of the monitored space.

22. The system of claim 20 wherein the application server is operatively connected to a control unit to establish a setback temperature for the monitored space.

23. The system of claim 20 wherein the application server includes data stored therein.

* * * * *